United States Patent [19]

Edwards, II

[11] 4,065,663

[45] Dec. 27, 1977

[54] RATE/TIME COMPUTER AND CONTROL DEVICE

[76] Inventor: James T. Edwards, II, 3236 S. Semoran, Apt. 12, Orlando, Fla. 32807

[21] Appl. No.: 639,650

[22] Filed: Dec. 11, 1975

[51] Int. Cl.² .................. G06F 15/20; G06F 7/50; G06F 7/52

[52] U.S. Cl. .................. 364/464; 235/92 GA; 364/569

[58] Field of Search .......... 235/92 GA, 92 T, 92 FL, 235/61.6, 61.8, 151.3, 156, 160, 170; 179/7.1 R, 7.1 TP; 340/51; 194/DIG. 18, DIG. 23

[56] References Cited

U.S. PATENT DOCUMENTS

| | | | |
|---|---|---|---|
| 3,024,991 | 3/1962 | Foote | 235/156 |
| 3,548,161 | 12/1970 | Schwarz | 235/61.6 R |
| 3,600,560 | 8/1971 | Gosselin | 235/92 GA |
| 3,641,314 | 2/1972 | Abramson | 235/61.8 A |
| 3,775,593 | 11/1973 | Gieringer et al. | 235/61.8 A |
| 3,809,872 | 5/1974 | Yamamura et al. | 235/170 |

*Primary Examiner*—Malcolm A. Morrison
*Assistant Examiner*—Errol A. Krass

[57] ABSTRACT

A rate/time control device for computing an activity period. The control device includes a clock for generating a representation of present time and an element for storing a start time therein. A first input element provides an input to the storage device from the clock representative of the start time. A first output element is provided for receiving an output from the storage device representative of the start time. A time computer is included for computing the activity period by subtracting the start time from the present time.

The control device further includes a rate selector and a charge computer for calculating a monetary charge for the activity period by multiplying the rate by the activity period. A plurality of the control devices may be coupled together to allow one control element to operate a plurality of units.

31 Claims, 3 Drawing Figures

Fig. 1a.

RATE/TIME COMPUTER AND CONTROL DEVICE

BACKGROUND OF THE INVENTION

1. Field of the Invention

This invention relates to rate/time measuring devices and in particular to a control device for computing the activity period for each unit of a plurality of units and computing the charge therefor.

2. Description of the Prior Art

The present system is designed for businesses such as bowling alleys, billiard parlors, taxi cab companies, motels, parking lots, automotive service centers and any other business which must record the activity period during which one unit of a plurality of units is being utilized. This system allows one centrally located operator to control all of the units and to quickly and accurately calculate the activity period therefore. This system therefore eliminates the possibility of mathematical errors on the part of the operator which is an inherent limitation of other manual or mechanical rate/time systems. It has also been a problem for businesses utilizing prior art systems to prevent the system operator from providing free time or from registering only shortened periods of time for his friends, good customers, etc. The operator could then either collect the full charge for the time used, thereby enabling him to retain the difference between the actual time charged and the charges registered on the equipment, or to merely collect for the time charged. Also under some prior art systems it is possible to reset the time or charge accumulators after the charge has been collected. Furthermore, it is a time consuming and error prone task for the owner to total all of the time and charges for all of the units and then compare these figures to the cash collected.

The art includes several solutions to these common problems. Gosselin in U.S. Pat. No 3,600,560 discloses a rate/time computer which includes a pulse generator adapted to generate pulses at a plurality of different frequencies. The rate/time computer further includes a plurality of accessory register assemblies which are coupled to the appropriate pulse generator for counting the pulses and therefore the total charge due during a preselected time period corresponding to the activity period of the unit. The charges are also totalled on a master totalizer so that the total count of all registers employed may be recorded. Strandberg in U.S. Pat. No. 3,003,691 discloses a more simplified version of the same general method and apparatus for counting impulses generated responsive to the activity period of a unit. An electro-mechanical system for recording the number of frames played in a game of bowling and to compute and record the rental charges due for the use of the bowling equipment is disclosed by Funk in U.S. Pat. No. 2,555,405.

Placke et al in U.S. Pat. No. 3,021,257, disclose another rate/time device which features a generator having a variable frequency corresponding to a rate which may be changed at various predetermined times throughout the day. An accumulator for each of the units is used to total the pulses generated during the activity period. The output of the accumulator may be arranged to reflect the charge due for the rental of the unit during the activity period. Burke in U.S. Pat. No. 3,666,928 and Walsh in U.S. Pat. No. 3,426,183, disclose other rate/time devices which are of interest.

Margolis in U.S. Pat. No. 3,448,459, discloses a tally system for recording the amount of hire of game equipment. The tally system records the amount of hire of the game equipment by totalizing the "on" time of electrical fixtures required to be associated with the equipment. The system incorporates a time stamp to mark time cards for manually calculating the activity period. The operation of the stamp is tied to the operation of the lights illuminating the game equipment so that the lights cannot be turned on or turned off without recording a time on the time card.

In contrast to the prior art inventions, the present invention contemplates a rate/time computer and control device comprising an arithmetic processing unit for calculating monetary charges accrued during an activity period of time charged at a preselected monetary rate. To begin the activity period, the appropriate table or memory number is entered on the main keyboard numerical switches. The keyboard output is fed to a keyboard encoder which eliminates switch bounce and converts the entered number into BCD form. The entered number is then fed into shift registers allowing an operator to enter a multi-digit number with the most significant digit first. The shift register output is then fed into a PROM (programmable read only memory) which converts the BCD input into a binary output. This binary output is used to select the appropriate memory address in the date, time, rate and on/off memories. Following the entry of the table number, the READ switch is activated which enables a system strobe allowing an arithmetic processing unit (APU) to step through its program, but only if the selected on-off memory is in the on position. Interlock protection is provided so that a new activity period may only be commenced when the selected on/off memory is in the off position. After activating the READ switch the keyboard is again utilized to insert a rate code (which may correspond to, for instance, the number of players). This rate code is stored in the selected memory address of the rate memory. This rate code will subsequently be used to select a predetermined monetary rate and also a predetermined minimum rate corresponding thereto, both of which are stored in a rate PROM.

After entering the rate, the BEGIN switch is activated which produces a write pulse, which accordingly writes the time, day and rate code into the appropriate memories, along with resetting the corresponding on/off memory address to the on position. When the on/off memory goes to the on position, the APU program control is enabled allowing the APU to step through its program. After beginning the activity period the calculator is returned to its normal or ready mode. In the normal position, the time display shows the time of day, and the status indicators show the status of the on/off latch, thereby representing the status of each of the individual operating units.

To check the amount of charges or to end the activity period the table number is entered as described above. Upon activating the READ switch, the APU steps through its program and displays the amount of charges. In addition, the time begin and the rate number are also displayed. When the TOTAL key switch is activated the activity period is ended and the monetary charge therefore is calculated. The monetary charge is then added to an additional register for maintaining a running total of the charges accrued subsequent to the initializing of the running total accumulator.

SUMMARY OF THE INVENTION

The present invention contemplates a rate/time control device for computing an activity period. The control device includes clock means for generating a representation of present time and storage means for storing a start time therein. First input means are included for providing an input to the storage means from the clock means representative of the start time. First output means are provided for receiving an output from the storage means representative of the start time. The control device further includes computation means for computing the activity period by subtracting the start time from the present time. The control device further includes means for selecting a rate, and charge computation means for computing a monetary charge for the activity period by multiplying the rate by the activity period.

DESCRIPTION OF THE PREFERRED EMBODIMENT

The electronic circuit elements uitlized in a first preferred embodiment of the rate/time computer and control device will now be described with reference to FIGS. 1a, 1b, and 1c. The rate/time computer and control device includes 10 keyboard numerical switches 20 (first and second selecting means), the switches being numbered sequentially from zero to nine. The output of the keyboard numerical switches 20 is fed to a keyboard encoder 22 which decodes the information into BCD form which in turn is fed into a shift register 26. The keyboard encoder 22 also includes a keypunch output which is fed to a one shot 24. When one of the keyboard numerical switches 20 is depressed the one shot 24 is activated which eliminates any roll-over or any possibility of activating two of the keys at the same time. The one shot 24 also produces an output Q which clocks the shift register 26 to accept the input numbers sequentially, most significant digit first, with dead time therebetween. The output of the shift register 26 is fed to a latch 30 (first latch). The output of the latch 30 is then fed to a BCD to binary PROM 28 which converts the BCD output of the latch into a binary numerical form, which is then used to select the desired numerical address within each of the memories which will be subsequently discussed. The latch 30 is updated by the output of the keyboard encoder only when the system strobe is in the not position which will enable the gate 34 and the gate 35.

The system strobe (S/ST) is an output signal at line 41 from a set-reset flip-flop 40. A not system strobe (which is abbreviated NOT/S/ST or $\overline{S/ST}$), is an output of the set-reset flip-flop 40 which is complementary to the system strobe output 41. A READ switch 36 (check means) activates the set-reset flip-flop 40 which causes the system strobe 41 to go high (high as used hereinafter means a positive voltage or a binary 1 signal as compared to a ground, low voltage or binary 0 signal). The system strobe signal 41 is utilized at various points throughout the system for interlock protection for disabling certain functions at various points throughout the operating procedure. As an example, activating the READ switch 36 activates the set-reset flip-flop 40 causing the system strobe 41 to go high. This disables a gate 34 which in turn disables the latch 30. Other disabling functions will be explained subsequently.

When the system strobe 41 goes high it also enables a gate 48 so that the keyboard numerical switches 20 may then be depressed to enter a rate representation. The selected rate representation numerals in BCD form are generated by the keyboard encoder 22 and pass through the shift register 26 and then into a rate latch 50 (second latch). The rate latch 50 is enabled by the gate 48 only when the system strobe 41 is high and the one shot 24 is high.

Recapping the procedure up to the present point, the memory address or table number has been stored in the latch 30 and remains there after the enable signal from the gate 34 has been removed therefrom. The memory address or table number has identified or selected a numbered memory address in the memories which will be subsequently loaded. When a BEGIN switch 44 (first and second input means) is depressed a write signal will be generated by a gate 46 (rate interlock means) only if several conditions are satisfied. First, the system strobe 41 must be high which prevents the operator from accidentally activating the BEGIN switch when the system is off. Secondly, the rate RAM addressed function must be high which prevents the operator from beginning a time period with no rate inserted into the rate memory 118. The write signal is passed from the gate 46 into a one shot 52 which acts as a pulse stretcher to assure that the positive going write signal at the input to a gate 54 is of sufficient duration to allow for the insertion of data into the memories, as will be discussed subsequently.

The clock memory means includes a date memory 100 and a time memory 108, both of which have a plurality of addresses therein. A clock (or clock means) includes a twenty-four hour timing clock 110, date counter 102 and a latch 112. A rate memory means includes a rate memory 118 which has a plurality of addressable memories in which the rate codes are stored. The output of the rate memory 118 is fed to a data select 120 which feeds either the output of the rate memory 118 or the output of the latch 50 as a memory address select function for a rate PROM 122 which is used to store a predetermined monetary rate paired with or corresponding to the rate code selected by the operator. The rate code is also used to select a memory address in the rate PROM 122 corresponding to the predetermined minimum charge corresponding to that rate code. An on/off memory 116 (first interlocking means) is included to prevent the operator from inserting new information into a selected memory corresponding for a table or alley which is already in use. The binary output of the PROM 28 is fed in parallel to the address select lines of the date memory 100, the time memory 108, the rate memory 118, and the on/off memory 116 so that when the table number is punched in through the keyboard numerical switches 20 the corresponding memory address will be selected. That is, if table number 14 is punched into the keyboard numerical switches 20, then memory address number 14 will be selected in the date memory 100, the time memory 108, the rate memory 118 and the on/off memory 116. When a write signal is supplied to a write enable line 55 at the output of the gate 54, the data present at the data input of each of the memories would be loaded in the memory address which has been selected. Thus, the output of the 24 hour time clock 110 (present time) will be stored in the latch 112 and is constantly updated when the system strobe 41 is at zero. When the system strobe is high, the latch 112 is locked. The present time would be loaded into the selected address of the time memory 108 upon the write enable line 55 going high. Similarly, the output of the 24 hour time clock 110 will allow the date counter 102 to calculate the proper date. Upon the write enable line 55 going high, the date from the date counter 102 will be recorded in the selected memory address of the date memory 100. The rate code stored in the rate latch 50 will likewise be recorded in the selected memory address of the rate memory 118 when the write enable line 55 goes high. Also, an on signal will be recorded in the selected memory address of the on/off memory 116 when the write enable line 55 goes high.

In a similar manner, an address within an N bit addressable latch 160 will be designated by the binary output of the PROM 28. When the write enable line 55 goes high, an on signal will be recorded in the selected address of the N bit addressable latch 160 (or on/off latch). Outputs L1 through LN of the N bit addressable latch 160 (enabling means) are used to control a plurality of drivers 166, each one of which is coupled to one of the units for which the activity period is being measured. For example, if table 14 is selected by depressing the corresponding keyboard numbered switches 20, then an on signal will be stored in the fourteenth address of the N bit addressable latch 160, which will in turn cause the output L14 (not shown) to go high. This high output will cause the corresponding driver 166 on line 14 to enable a power relay (not shown) for controlling the unit. The power control relay may actuate lights above a billiard table, turn on an automatic pin spotter, or other similarly useful functions. Thus, the N bit addressable latch 160 will not allow the operator to give free time on one of the units, since whenever the power relay for that unit is enabled the corresponding address of the ON memory 116 is also loaded with an ON signal. The outputs L1 through LN of the N bit addressable latch 160 are also fed into a driver decoder 162 for powering a series of table status indicator lights 164. Thus, whenever table 14 is on the number 14 on status indicators 164 will also be illuminated.

It should be noted at this point that the only method of erasing the information stored in any of the memories is by actuating a TOTAL switch 60 (terminating means). This function prevents a dishonest operator from inserting a new begin time into a selected memory address of the time memory 108 for a unit which is already in use. If an error is made in inserting any of the information to be stored or in selecting a table or memory address then it can be corrected at any time prior to the actuation of the BEGIN switch 44 by activating the CLEAR switch 56 which passes a clear signal through the gates 35 and 37, thereby clearing the latches 30 and 50 having the memory address and the rate codes respectively stored therein.

Assume now that the correct information has been loaded into the addressable date, time, rate, on/off memories, and on/off latch by actuating the BEGIN switch 44. The operator must then actuate the CLEAR switch 56 which will set the system strobe 41 to the low position, which will reset the control counter 130 to the zero or initial position, which in turn sets a program PROM 134 to the zero step. This causes the begin strobe output of the program PROM 134 to go low, which causes a gate 187 to go low, which causes the data select 189 to select the "a" input, which corresponds to the output of the time clock latch 112. Thus, the present time of the day, which is constantly updated by the 24 hour clock 110, will be fed from the latch 112 into the data select 189 and then directly to an input of the multiplexer 220, as will be explained subsequently.

Now assume that the customer or operator desires to terminate the activity period for unit 14. The operator would then enter the digits 1 and 4 on the keyboard numerical switches 20. This information will proceed through the keyboard encoder 22, the shift register 26, the latch 30, and the BCD to binary converter 28. At this point the system strobe 41 remains off (or low), which disables the control counter 130, which in turn causes a program PROM 134 to remain at its zero or continuous clearing position. The operator then actuates the READ switch 36 which sets the system strobe 41 to high. With reference to a gate 128, the system strobe 41 would be high, and if the unit is in use the on signal would of course be present, which would actuate a control counter 130 to signal the program PROM 134 to sequence through its program steps.

The sequential program steps of the program PROM 134 are included in table one. The zero position causes the program PROM 134 to continuously clear and remain ready for any subsequent instructions. When the gate 128 is actuated and the control counter 130 initilizes the program PROM 134, the sequence of steps begins as follows: Upon the removal of the clear input 129 to the control counter 130, the control counter 130 will step to the next position at the next busy output signal 171 from an APU 170 (or digital computation means) which is then passed through the flip-flop 174. Position one of the program clears the system again which allows sufficient set-up time for the selected memories to be addressed. At position two the begin strobe output of the program PROM 134 goes low causing the output of the gate 187 to go low, thereby selecting the present date from the date counter 102 and the present time from the latch 112 as the desired inputs for the data select 189, which are then fed into the multiplexer 190. The program PROM 134 at position two would then instruct the multiplexer 190 to select the most significant digit of the date end which is fed from the data select 189. As the program PROM 134 increments through the program steps, the date end is multiplexed one digit at a time (with the most significant digit first) into the data select 156. The parallel output of the data select 156 is then fed into the input timing buffer 172. The D1 to D11 outputs of the APU 170 are then fed into the input timing buffer 172 which synchronizes the input of the data into the APU 170 as it is required. During this loading process an output 135 from the program PROM 134 causes the data select 156 to select the data from the multiplexer 190 which is being fed thereinto. When the program PROM 134 reaches step five, the output 135 causes the data select 156 to select the command stored in the program PROM 134 at that particular step to be fed into the input timing buffer 172 for subsequent loading into the APU 170.

In a similar manner all of the information stored in the memories and all of the commands stored in the program PROM 134 are loaded into the APU which then calculates the activity period and the charge due at step 34 for the activity period.

During the time period when each of the BCD digits is being loaded into the APU 170, a busy output 171 of the APU 170 goes high signifying that the instruction has been entered and the APU 170 is processing the information. The busy output 171 actuates a flip-flop 174. A sequence of digital timing outputs D1 through D11 are included on the APU 170 for sequencing the input of the BCD input information. The digital timing outputs D1 through D11 are sampled by the input timing buffer 172 for gating the BCD input information into the APU 170. The busy input 171 is clocked into the flip-flop 174. when both the D11 digital timing output and the busy output 171 of the APU 170 go high, the output of the flip-flop 174 will go high, which is passed through a gate 126 (assuming that the program is not at step 35) and through a gate 132 into the control counter 130. This, in turn, causes the program PROM 134 to increment one additional step.

When the program PROM 134 reaches step 35 the gate 126 is disabled and the output line 137 of the program PROM 134 goes low, which disables one input of a gate 178. The output of the gate 178 is coupled to a keypunch input 173 of the APU 170. The APU 170 will not proceed further until the keypunch input 173 has been actuated, an event which cannot occur unless a second input of the gate 178 goes high. This second input of the gate 178 is controlled by the minimum charge means and the nickle comparator means (or predetermined multiple means) which will now be discussed.

When the READ switch 36 is depressed the system strobe output 41 of the set-reset flip-flop 40 will go high. Both the on and the system strobe inputs to the gate 128 will then be high which will initialize the control counter 134. The programmable PROM 134 will sequence through the steps listed in table one. When step 35 is reached, the output 137 of the program PROM 134 goes low causing the output of the gate 178 to go low, which causes the keypunch input 173 of the APU 170 to be removed. The charge due, which is calculated by the APU 170, is then fed through the data line 199 to the latches 200 through 206. The digit one through digit three outputs of the latches 200 through 204 are fed into a comparator 142. Also, the minimum charge (in dollars and cents) is fed from the output of the rate PROM 122 into a second input of the comparator 142. If the charge computed by the APU 170 and displayed in the latches 200 through 204 is less than the minimum charge input to the comparator 142, (minimum charge means) then a high signal will be transmitted to a gate 188. This signal will be passed through the gates 182, 180 and 178 into the keypunch input 173 of the APU 170. Upon the keypunch input 173 going high, the APU 170 will be instructed to process the command present at the input timing buffer 172 which corresponds to the add one command from the step 35 of the program PROM 134. The charge due will then be incremented by one unit of charge causing the latches 200 through 204 to update reflecting the new charge. In turn, this new charge will be fed back to the comparator 142 and again compared to the minimum charge from the rate PROM 122 as previously explained. Finally, when the charge due in the latches 200 through 204 is equal to the minimum charge from the rate PROM 122, the output of the comparator 142 will go low, thereby removing the keypunch signal 173 from the APU 170, thereby ceasing the add one increments.

Next, the digit one output of the latch 200 is compared by a comparator 186 (means for increasing the charge until it is a multiple of a predetermined number) to an output signal from the signal generator 184. In the preferred embodiment of the present invention the signal generator 184 generates a zero and five signal which of course is a multiple of the digit 5, although any predetermined number may be chosen for the output of the signal generator 184. If the digit one input and the output of the signal generator 184 are different, then the output of the comparator 186 will cause the keypunch input 173 of the APU 170 to go high which, as previously explained, will allow the add one command from the program PROM 134 to be entered into the APU 170. Thus, the digit one output from the latch 200 will be incremented by one unit of charge until that digit is either a zero or a five. At this time the output of the comparator 186 will go low disabling the keypunch input 173 to the APU 170. After a delay determined by a one shot 176 the output of the one shot 176 will signal that the APU is ready for further instructions, such as a TOTAL command.

After the APU 170 has calculated the charge due and the minimum charge logic and the nickle comparator logic (charge predetermined multiple) have been traversed, the parallel BCD output from the APU 120 will be fed through an output data bus 199 to the output registers 200 through 210. Of course, one skilled in the art will immediately recognize that while the output data bus 199 is shown as a single line, it actually comprises a four line parallel BCD output.

The charge due will then be loaded into the output registers 200 through 206. The first three digits of the amount due which are loaded in the output registers 200, 202 and 204, are fed into another data select buffer 214. These first three digits together with the fourth digit which is stored in the output register 206 are fed into another data select buffer 216. The data select buffers 214 and 216 are also used to select the date and the running total at different times, with these outputs being controlled by a gate 212 and a gate 211 respectively.

Returning again to the amount due or charge sequence, the four digits of the charge are fed from the data select buffer 216 into inputs D1 through D4 of a multiplexer 220. An output of the multiplexer 220 is fed to a seven segment BCD decoder/driver 228 which is used to drive the readout means, which in this case would be a plurality of LED readouts 230. The least significant digit would be shown on an LED 241 and the digits of increasing significance would be shown on LEDs 242 through 244.

In a similar manner, the start time or time began would be displayed on LED readouts 234 through 237 (in the order of increasing significance). This function is accomplished by coupling the outputs H10, through H1 from a data select buffer 189 (the input 192 thereto must be a one) through an input of a 24 to 12 hour time converter PROM 218. The minutes digits are fed directly into the mutliplexer 220. The output of the time converter PROM 218 is then coupled to inputs D9 through D10 of the multiplexer 220 for subsequent display on readout means 230 (including LEDs 234–237) as previously described.

In a similar manner the rate code is fed from an output of the data select 120 directly to the rate code input of the multiplexer 220. Also, the selected memory address from the output of the latch 30 is fed directly into an input of the multiplexer 220.

The multiplexer 220 sequentially selects one of its 16 inputs for driving the decoder/driver 228 and its corresponding displays 230 and 240. Even though this sequential selection process is cycled many thousands of times per second, the residual illumination of the LED readouts 230 and 240 causes them to appear to be powered continuously. The sequencing of the multiplexer 220 is controlled by a counter 274 which feeds a data select buffer 272, which is coupled to an input 221 of the multiplexer 220. The operation of the data select buffer 272 will be described subsequently.

At this point the following information is displayed on the readout means 230 and 240: memory number or table number, rate code, time began, and the charge due. At this point, the operator may depress the CLEAR switch 56 which will return the program PROM 134 to step zero of the program, clear the readout means 230 and 240 of the preceding information and substitute therefor the present time. Activating the CLEAR switch 56 at this time will not end the activity period. On the other hand, if the customer or the operator wishes to terminate the activity period, such as at the end of a bowling or billiards game, the operator merely collects the charge due as shown in the readout means 240 from the customer and deposits this amount in the cash register. Simultaneously, the operator actuates the TOTAL switch 60 which will end the activity period and finalize the charge due figure contained in the output registers 200 through 206. By activating the TOTAL switch 60, the charge due, which is contained in the output registers 200 through 206, is added to a running total which is then stored for subsequent use.

The operation of this running total function will now be described. When the TOTAL switch 60 is activated the output of a gate 62 will go high if the rate RAM shows that no address is being directed to the rate memory 118, if the system strobe 41 is high and if the APU 170 is ready. The high output of the gate 62 will actuate a flip-flop 64 which will activate two one shots 66 and 70. The first one shot 70 has a time period T2 of approximately 1 second which is determined to be longer than the print time, which will be subsequently discussed. The negative going edge of the output of the one shot 70 triggers the one shot 72 signaling the end of the print cycle. This output is fed to one input of the gate 132. The other input to the gate 132 will be low since the program PROM 134 and APU 170 will have stopped at step 35. Thus, the control counter 130 will be enabled, which causes the sequencing of the program PROM 134 to step 36 which calls for an additional instruction to be entered in the APU 170. When the program PROM 134 reaches step 36 an add instruction is sent to the APU 170 which then adds the current charge to the total or running total stored in the total register latch 124, as specified in program steps 37 through 42. This new or updated running total is then fed through the output data bus 199 to the output registers 200 through 210. The digits 1 through 6 of the output registers 200 through 210 are then fed as inputs back into the total register latch 124 for storage therein. The digits 1 through 4 are present at the input of the data select buffers 214 and 216 only momentarily and therefore they are not visible on the readout means 240. The program PROM 134 immediately sequences to step 44. The running total from the latches 200 through 210 are recorded in the total register 124 at the command of the output of the one shot 66 which has a duration corresponding to a period of time greater than the time required to calculate, print and update the total register 124. Also, when the total switch 60 is activated the one shot 65 will disable the gate 58 which will disable the entering function of the clear switch 56.

Returning now to the print function, the actuation of the TOTAL switch 60 will cause the output of the flip-flop 64 to go high, which in turn actuates a printer control 280 having a programmable PROM and counter therein. The printer control 280 then begins a sequence of commands to the multiplexer 220 and to a print head 260 which effect a print out of the inputs to the multiplexer 220. As was previously discussed, the output of the counter 274 sequences from 0 to 15 at a predetermined rate for driving the multiplexer 220. When the printer is not being utilized the output of the counter 274 is fed through a first input of the data select buffer 272 to an input of the multiplexer 220. However, when the printer is actuated, a busy signal will be transmitted from an output 282 of the printer control 280 into the data select buffer 272 causing it to switch to a second input which is fed by a digit select output 284 of the printer control 280. This digit select output 284 sequences at a much slower rate through the zero to 15 inputs of the multiplexer 220. Then, in effect, the PROM within the printer control 280 causes the multiplexer to sequence in a preprogrammable manner through its inputs D1 through D13 at a much slower rate which can be handled by the printer.

The output of the multiplexer 220 is coupled to a BCD seven segment decoder 250 and then into a segment driver 252 which is coupled to a printhead 260. The PROM within the printer control 280 sequences the multiplexer through all 16 inputs and the print head 260 prints an output representative thereof. When the PROM within the printer control 280 returns to the zero position, the busy signal at the output 282 of the printer control 280 is removed from the data select buffer 272, by allowing the counter 274 to regain control of the multiplexer 220. Assuming that all of the information within the multiplexer 220 can be printed within a period of one second (T2 = 1 second) and the running total within the total register latch 124 can be updated within 0.1 second, then T1 would be equal to 1.1 seconds. Therefore, the positive going edge of the one shot 66 would update the total register latch 124.

The output of a TOTAL READ switch 74 is utilized to activate one input of the data select buffer 216 (see FIG. 1c) which feeds the running total from the first four outputs of the total register latch 124 (see FIG. 1b) into the first four inputs D1 through D4 of the multiplexer 220 for subsequent visual display on the LED readouts 241 through 244. The fifth and sixth digits of the total register latch 124 are fed directly into the multiplexer 220 at inputs D5 and D6 for display on the LED readouts 245 and 246. The TOTAL READ switch 74 includes a key operated lockable switch for preventing unauthorized personnel from viewing the running total stored within the total register latch 124. Another separate key is utilized to activate a key operated TOTAL CLEAR switch 76. The TOTAL CLEAR switch activates a gate 78 which causes the printer 280 to command the print head 260 and the multiplexer 220 to printout the running total which is stored in the total register latch 124. The PROM within the printer control 280 may also be programmed to print out the date and the time along with the running total so that all of the information is available for updating bookkeeping records. In addition, a total clear 2 output 286 of the printer control 280 will clear the running total within the total register latch 124 at the end of the printing sequence.

Figure 1A:
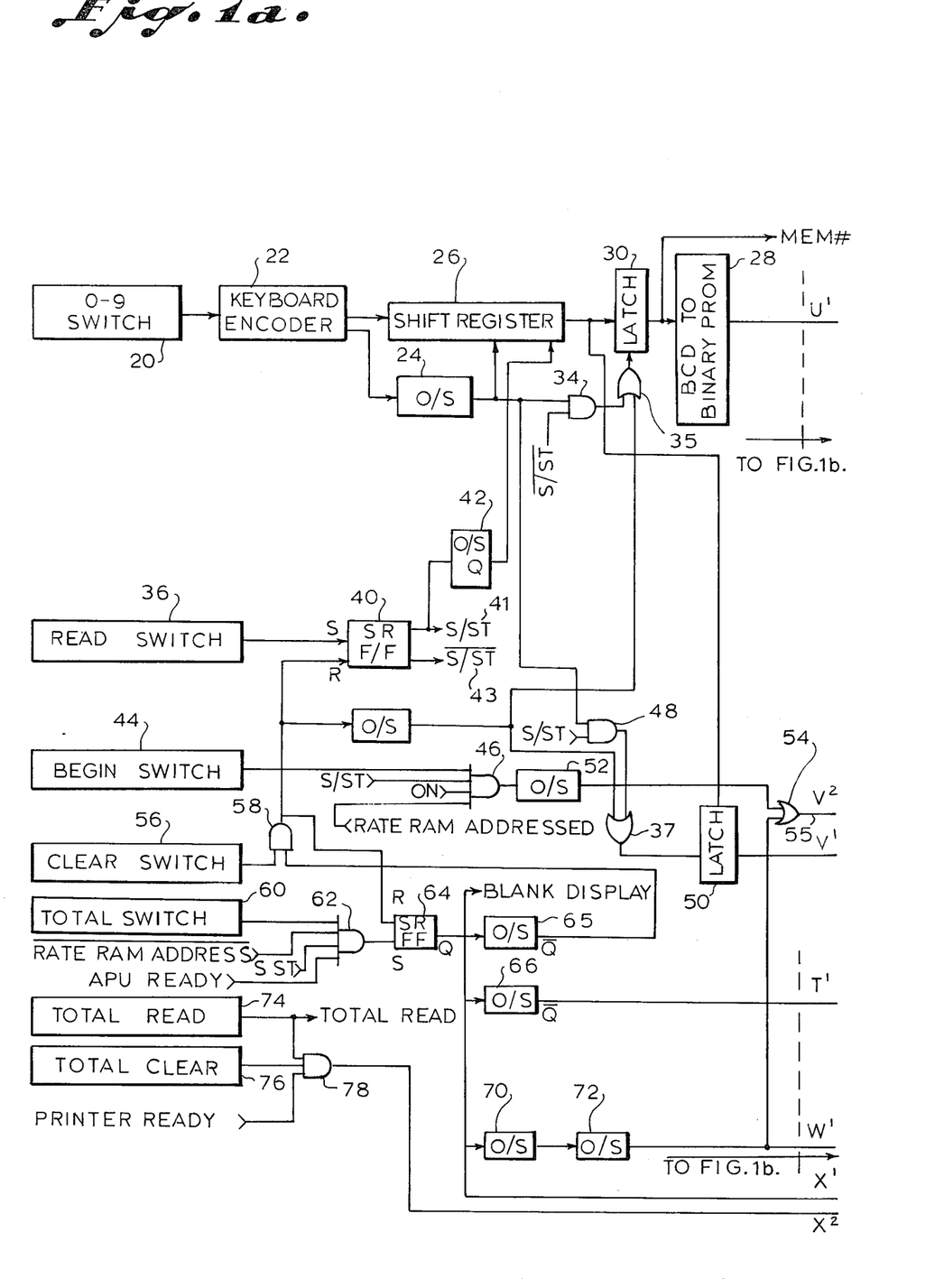
FIGS. 1a, 1b and 1c may be sequentially placed to provide the overall schematic block diagram of the rate/time computer and control device.
Figure 1B:
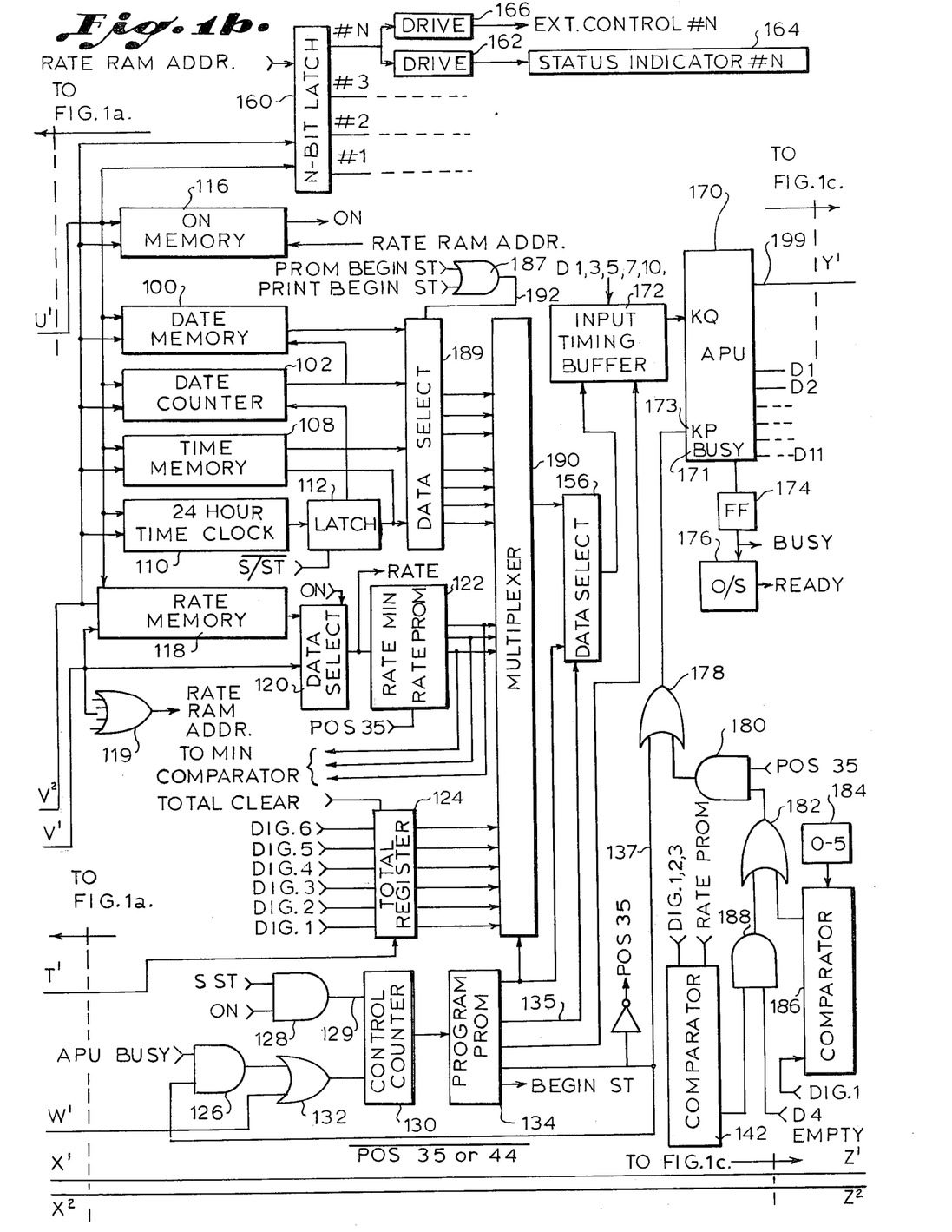
Figure 1C:
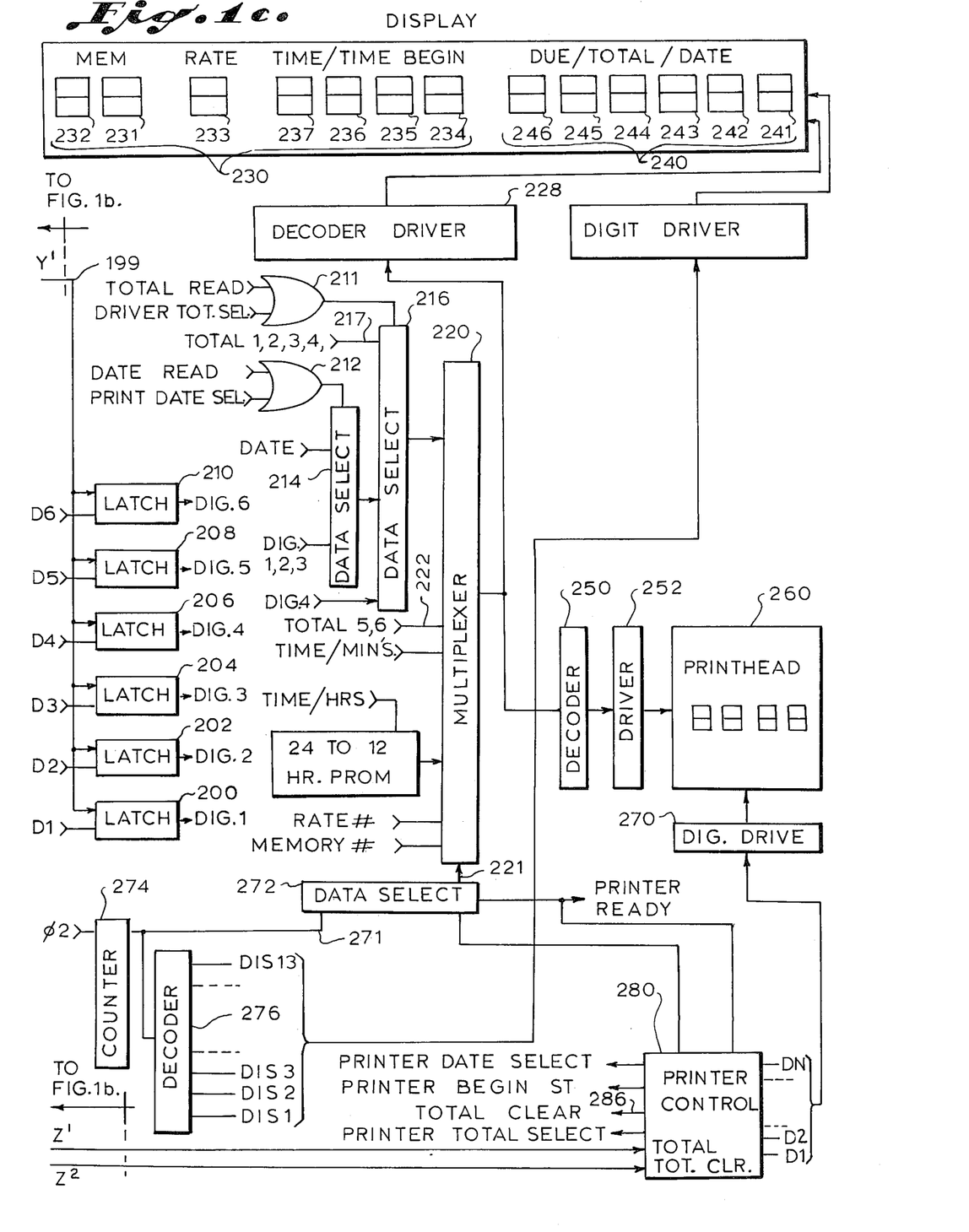

The operation of the rate/time computer and control device will now be summarized with reference to FIGS. 1a, b, and c. It will be first assumed that the time clock is set to the present time and the TOTAL CLEAR switch 76 has been actuated to clear and initialize the running total stored within the total register latch 124 and to toggle the on/off memory 116 and the on/off latch 160 to the off position. To begin the activity period the appropriate table, lane, or memory number is entered on the keyboard numerical switches 20. The keyboard output 20 is fed into a keyboard encoder 26 which eliminates switch bounce and converts the address number into a BCD format. The address is then fed into the shift register 26 allowing the operator to enter a multi-digit address number with the most significant digit first into the latch 30. The output of the latch 30 is then fed into a PROM converter 28 which converts the BCD input into a binary output. This binary output is used to select the appropriate address of the date memory 100, the time memory 108, the rate memory 118, the on/off memory 116 and the on/off latch 160.

Next, the operator actuates the READ switch 36 which enables the system strobe 41 allowing the APU 170 to step through its program only if the selected address within the on/off memory is in the on position. It is important to re-emphasize that a new activity period is begun only when the addressed memory within the on/off memory 116 contains an off signal, which is transferred to an input of the gate 46. The activation of the READ switch 34 re-enables the keyboard numerical switches 20 for entering a rate (which usually corresponds to the number of players). This rate is then used to address the rate memory 118. The operator then actuates the BEGIN switch which produces a write pulse on the write enable line 55 which causes the start date (date began) to be entered into the selected address of the date memory 100, causes the start time (hours and minutes began) to be entered into the selected memory address of the time memory 108, and causes the selected rate code to be entered into a selected rate address of the rate memory 118. The write pulse also enters an on signal into the selected address of the on/off memory 116, and on/off latch 160.

When the on/off memory 116 goes to the on position, the control counter 130 enables the program PROM 134 to sequence the APU 170 through the sequential steps of its program. At the end of the program a minimum charge would be displayed. After the beginning of the activity period the rate/time calculator is returned to its normal system strobe off position by actuating the CLEAR switch 56. In this normal operating position the readout means 230 displays the present time and the status indicators 164 show the status of the on/off latch 160 for each of the tables, lanes or memories. Also, beginning a new activity period enables the drive elements 166 to the appropriate tables or lanes.

To check the charge of a currently running activity period, the operator enters the table number on the keyboard numerical switches 20 as previously described. When the operator actuates the READ switch 36 the program PROM 134 causes the APU 170 to sequence through its steps resulting in the display of the charge due upon the readout means 240. Also, the START time, or time BEGIN, and the rate code are also displayed on the readout means 230. When the operator then activates the TOTAL switch 60 the activity period is terminated and the charge due is added to the running total contained within the total register latch 124.

It will be clear at this point that a rate/time computer and control device has been provided which overcomes many of the prior art problems. However, the invention is not to be construed as limited to the particular forms disclosed herein since these embodiments are subject to technological updating and are to be regarded as illustrative rather than restrictive.

TABLE I

PROGRAM STEPS FROM PROGRAM PROM (134) TO APU (170)

| Pos. | Entry | Comment |
|---|---|---|
| 0 | CLEAR | INSTRUCTION |
| 1 | CLEAR | INSTRUCTION - Hold Period |
| 2 | DATE END (msd) | } |
| 3 | DATE END | } DATE END |
| 4 | DATE END (lsd) | } |
| 5 | — | INSTRUCTION |
| 6 | DATE BEGIN (msd) | } |
| 7 | DATE BEGIN | } DATE BEGIN |
| 8 | DATE BEGIN (lsd) | } |
| 9 | X | INSTRUCTION |
| 10 | 2 | } CONVERT DAYS TO HOURS |
| 11 | 4 | } |
| 12 | + | INSTRUCTION |
| 13 | HOURS END (msd) | } HOURS END |
| 14 | HOURS END (lsd) | } |
| 15 | — | INSTRUCTION |
| 16 | HOURS BEGIN (mds) | } HOURS BEGIN |
| 17 | HOURS BEGIN (lsd) | } |
| 18 | X | INSTRUCTION |
| 19 | 6 | } CONVERT HOURS TO MINUTES |
| 20 | 0 | } |
| 21 | + | INSTRUCTION |
| 22 | MINUTES END (msd) | } MINUTES END |
| 23 | MINUTES END (lsd) | } |
| 24 | — | INSTRUCTION |
| 25 | MINUTES BEGIN (msd) | } MINUTES BEGIN |
| 26 | MINUTES BEGIN (lsd) | } |
| 27 | X | INSTRUCTION |
| 28 | RATE (msd) | } RATE |
| 29 | RATE | } |

TABLE I-continued
PROGRAM STEPS FROM PROGRAM PROM (134) TO APU (170)

| Pos. | Entry | Comment |
| --- | --- | --- |
| 30 | RATE (lsd) | |
| 31 | ÷ | INSTRUCTION |
| 32 | 6 | } CONVERT TO CHARGES |
| 33 | 0 | |
| 34 | = | INSTRUCTION |
| 35 | ADD "1" | INSTRUCTION (round off and minimum) |
| 36 | + | INSTRUCTION |
| 37 | TOTAL (msd) | |
| 38 | TOTAL | |
| 39 | TOTAL | } TOTAL |
| 40 | TOTAL | |
| 41 | TOTAL | |
| 42 | TOTAL (lsd) | |
| 43 | = | INSTRUCTION |
| 44 | NOTHING | READY SIGNAL |

I claim:

1. A control device for computing a charge for an activity period, said control device comprising:

clock means for generating a representation of present time;

clock memory means having a plurality of clock memory addresses therein, each of said clock memory addresses for storing a start time therein;

rate memory means having a plurality of rate memory addresses therein, each of said rate memory addresses for storing a rate representation therein;

first selecting means for selecting one of said clock memory addresses, and for selecting one of said rate memory addresses;

first input means for providing an input from said clock means to said selected clock memory address, said input representative of said start time;

second selecting means for selecting said rate representation;

second input means for providing an input from said second selecting means to said selected rate memory address;

first output means for providing an output signal representative of said start time from said selected clock memory address, and for providing an output signal representative of said rate representation from said selected rate memory address; and digital computation means for receiving input signals from said clock means and said first output means, for computing said activity period by subtracting said start time from said present time, and for computing said charge for said activity period by multiplying said rate representation by said activity period.

2. The control device as described in claim 1 including read-out means for displaying at least one of said present time, said selected clock memory address, said rate representation, said start time, said activity period and said charge.

3. The control device as described in claim 2 wherein said digital computation means includes totalizing means for calculating, storing and updating a running total of said charges for said activity period.

4. The control device as described in claim 3 including means for displaying said running total.

5. The control device as described in claim 4 including total clearing means for clearing said running total, said total clearing means including locking means for preventing unauthorized access thereto.

6. The control device as described in claim 3 including means for enabling a selected unit during said activity period.

7. The control device as described in claim 2 including minimum charge means for increasing said charge to a predetermined minimum charge when said charge is less than said predetermined minimum charge.

8. The control device as described in claim 7 wherein said minimum charge means includes:

comparator means for generating an add signal responsive to said charge being less than said predetermined minimum charge;

addition means for adding an additional unit of charge to said charge responsive to said add signal, whereby said charge is incrementally increased by said additional unit of charge until said charge is equal to said predetermined minimum charge.

9. The control device as described in claim 7 further including:

predetermined rate memory means for storing a plurality of predetermined rates, with each of said predetermined rates having a rate code paired therewith;

rate coding means coupled to said second selecting means for allowing said second selecting means to designate one of said rate codes as said rate representation;

rate output means, interposed between said first output means and said computation means, for selecting from said predetermined rate memory means said rate representation corresponding to said paired one of said rate codes provided by said first output means.

10. The control device as described in claim 9 wherein said minimum charge means further includes:

predetermined minimum charge memory means for storing a plurality of predetermined minimum charges, each of said predetermined minimum charges being paired with one of said predetermined rates;

means for providing an input representative of said paired one of said predetermined minimum charges to said minimum charge means responsive to said paired one of said predetermined minimum rates being provided by said first output means from said selected rate memory address.

11. The control device as described in claim 10 including first interlock means for locking out the insertion of a subsequent start time into said selected clock memory address during said activity period.

12. The control device as described in claim 11 wherein said first interlock means comprises:
- an on/off memory means having a plurality of on/off memory addresses therein, each of said on/off memory addresses for storing one of an on and an off signal therein;
- on means, activated by said first input means, for providing said on signal to a selected one of said on/off memory addresses selected responsive to said first selecting means; and
- off means, activated by said first output means, for providing an off signal to said selected on/off memory address responsive to the termination of said activity period.

13. The control device as described in claim 12 wherein said first interlock means further includes rate interlock means for allowing said present time representation to pass to said clock memory means only responsive to an activation of said second selecting means.

14. The control device as described in claim 12 wherein said clock means comprises:
- a clock for generating a present time signal representative of hours and minutes; and
- a date counter coupled to said clock for generating a present date therefrom.

15. The control device as described in claim 14 wherein said clock memory means comprises:
- a date memory having a plurality of date memory addresses therein for being selected by said first selecting means, each of said date memory addresses for storing a start date therein; and
- a time memory having a plurality of time memory addresses therein for being selected by said first selecting means, each of said time memory addresses for storing said start time therein.

16. The control device as described in claim 7 including means for increasing said charge until said charge is a multiple of a predetermined number.

17. The control device as described in claim 1 wherein said first selecting means comprises a plurality of switches, said plurality of switches including at least ten switches for representing the arabic numerals zero through nine inclusive.

18. The control device as described in claim 17 wherein said first selecting means further comprises a keyboard encoder coupled to said plurality of switches for generating a BCD representation responsive to the activation of said switches.

19. The control device as described in claim 18 wherein said first selecting means further comprises a shift register for receiving said BCD representation from said keyboard encoder, most significant digit first, for storage therein.

20. The control device as described in claim 17 wherein said second selecting means comprises said plurality of switches of said first selecting means.

21. The control device as described in claim 17 wherein said first input means includes a first latch coupled between said first selecting means and said clock memory means for storing therein a representation of said selected clock memory address until activation of said first input means.

22. The control device as described in claim 21 wherein said second input means includes a second latch coupled between said second selecting means and said rate memory means for storing therein said selected rate representation until activation of said second input means.

23. The control device as described in claim 22 wherein said second input means is coupled to said first input means for activating said first input means responsive to an activation of said second input means.

24. The control device as described in claim 23 wherein said first input means and said second input means further comprise a begin switch coupled therebetween for generally simultaneous activation thereof.

25. The control device as described in claim 1 wherein said first output means includes interlock means for enabling the activation thereof only subsequent to the entry of said selected clock memory address by activation of said first selecting means.

26. The control device as described in claim 25 wherein said first output means includes activating means for activating said digital computation means.

27. The control device as described in claim 26 wherein said first output means further comprises check means for enabling said activating means without terminating said activity period.

28. The control device as described in claim 27 wherein said first output means further comprises terminating means for enabling said activating means and for terminating said activity period.

29. The control device as described in claim 1 wherein said digital computation means comprises, in combination:
- arithmetic processing means for performing digital computations on said input signals to provide said activity period and said charge therefore;
- programmable PROM means for sequencing the computations of said arithmetic processing means.

30. The control device as described in claim 29 wherein said programmable PROM means includes means for sequencing inputs into said arithmetic processing means.

31. The control device as described in claim 30 wherein said digital computation means operates responsive to activation of said first output means.

* * * * *